United States Patent [19]

Cherubim et al.

[11] 3,759,925

[45] Sept. 18, 1973

[54] PREPARATION OF BICYCLICAL LACTAMS

[75] Inventors: Martin Cherubim, Rheinkamp-Eick; Faisal Abodagga, Rheinkamp-Utfort, both of Germany

[73] Assignee: Deutsche Texaco Aktiengesellschaft, Munich, Germany

[22] Filed: Aug. 28, 1972

[21] Appl. No.: 284,191

[30] Foreign Application Priority Data
Sept. 3, 1971 Germany............... P 21 44 178.1

[52] U.S. Cl............................. 260/293.55, 260/999
[51] Int. Cl............................................. C07d 39/10
[58] Field of Search................................ 260/293.55

[56] References Cited
FOREIGN PATENTS OR APPLICATIONS
1,110,895  4/1968  Great Britain................ 260/293.55

OTHER PUBLICATIONS

Badger, J. Chem. Soc. 1949, 1141–1144.

*Primary Examiner*—Henry R. Jiles
*Assistant Examiner*—G. Thomas Todd
*Attorney*—Thomas H. Whaley et al.

[57] ABSTRACT

1,8-Diaza-9,10-dialkyl-bicyclo-(4,4,0)-decane-(2,7)-diones are prepared by reacting a dicyanoethylated ketone, such as 2,2-di (beta-cyanoethyl)-butanone-3 in the presence of an inert solvent, such as methyl alcohol, and a basic catalyst at a temperature of about 20° to about 200° C.

9 Claims, No Drawings

PREPARATION OF BICYCLICAL LACTAMS

This invention relates to bicyclical lactams and to a process for their preparation. More particularly this invention relates to 1,8-diaza-9,10-dialkyl-bicyclo-(4,4,0)-decane-(2,7)-diones. These bicyclical lactams are hereinafter called "Dibidon."

A known method of producing lactams is to heat amino acids at a relatively high temperature. The lactams obtained in moderate yields by this method are, however, susceptible to be split up again to the amino acids when the reaction is conducted in the presence of acids and alkalies. Surprisingly, it has been found that bicyclical lactams of the "Dibidon" type may be obtained in relatively good yields by reacting dicyanoethylated ketones in alkaline solutions.

With the present invention 1,8-diaza-9,10-dialkyl-bicyclo-(4,4,0)-decane-(2,7)-diones of the general formula:

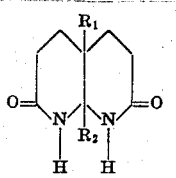

are prepared by reacting a dicyanoethylated ketone of the general formula:

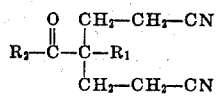

in which $R_1$ and $R_2$ are independently selected alkyl groups having from 1 to 5 carbon atoms in the presence of a solvent and a basic catalyst at a temperature of between about 20° and 200° C.

The formation of lactams of the "Dibidon" type described above is surprising inasmuch as cyclization under these conditions has heretofore not been observed. Bicyclical compounds of the above-mentioned formula have not been produced thus far.

Ketones useful as starting materials in the process of this invention include, for example:

2,2-di (beta-cyanoethyl)-butanone-3,
2,2-di (beta-cyanoethyl)-pentanone-3,
2,2-di (beta-cyanoethyl)-4-methyl-pentanone-3
2,2-di (beta-cyanoethyl)-5-methyl-hexanone-3,
3,3-di (beta-cyanoethyl)-octanone-4,
3,3-di (beta-cyanoethyl)-2-methyl-octanone-4,
4,4-di (beta-cyanoethyl)-2,6-dimethyl-octanone-5 and
4,4-di (beta-cyanoethyl)-decanone-5.

An especially valuable group of ketones are those of the above-defined formula wherein $R_1$ and $R_2$ are independently selected alkyl groups having from 1 to 3 carbon atoms as exemplified by methyl, ethyl, isopropyl, etc.

A wide variety of inert solvents may be employed in conducting the reaction. Advantageously, polar solvents such as primary, secondary or tertiary alcohols are used. For example, methanol, ethanol, isopropanol or tert.-butanol may be utilized as solvents. The amount of the solvent used may be varied widely although generally from about 100 to about 1500 and, preferably, from about 100 to about 1000 grams of the inert solvent per mole of the dicyanoethylated ketone charged to the reactor is employed. Preferably, the reaction is conducted under reflux conditions in boiling alcohol with temperature ranging from about 60° to about 120° C.

Suitable basic catalysts include alkali metal hydroxides, alkaline earth hydroxides, alkali metal alcoholates, or alkaline earth alcoholates, e.g., sodium hydroxide, potassium hydroxide, magnesium hydroxide, sodium isopropylate, sodium tert.-butylate, etc. Usually from about 001 to about 0.5 mole of the basic catalyst per mole of dicyanoethylated ketone is used.

Recovery of the bicyclical lactams from the reaction mixture can be accomplished in a number of ways. For example, the lactam product may be removed from the reaction mixture by extraction with a suitable solvent such as chloroform, the extract dried over sodium sulfate and the product recovered by evaporation of the solvent.

The composition and structure of the compounds of this invention have been ascertained by carbon-hydrogen-nitrogen elemental analysis, proof of functional groups, preparation of derivatives UV, IR, NMR, and mass spectrophotometry as well as by determination of the molecular weight.

Saponification of 1,8-diaza-9,10-dimethylbicyclo-(4,4,0)-decane-(2,7)-dione, i.e.,dimethyl-"Dibidon," produced according to the process of this invention in aqueous KOH (potassium hydroxide solution) leads to the corresponding dicarboxylic acid:

1,8-diaza-9,10-dimethyl-bicyclo-(4,4,0)-decane-(2,7)-dione is saponified by appropriately mixing 50 grams of this compound corresponding to 0.138 mole, with 50 grams of potassium hydroxide and 500 grams of water and heating the mixture at reflux for 13 hours. Then, the reaction mixture is mixed with 200 ml of water and acidified with concentrated hydrochloric acid up to a pH value of unity, followed by extraction with ethyl acetate. The extracts are dried over sodium sulfate, filtered and concentrated. The residue is recrystallized from ethyl acetate. Yield:55.5 grams (=85.6 percent of theory) of 4-methyl-4-acetoxy pimelic acid having a melting point of 125° C. These compounds are efficient bactericides. Because of their structure they may also be used as bacteriostatics or they may be applied in other fields of pharmaceutics. The use of the "Dibidon" type bicyclical diones of this invention in dissolved form or in combination with liquid substances as selective solvents is another interesting aspect. The compounds produced according to the invention may be used as intermediate products for organic syntheses, as raw material for plastics, e.g., in the production of polyamides, epoxide resins or formaldehyde crosslinked resins. Their derivatives, obtained by methylolation, can be used in textile finishing.

The compounds may be reacted with alcohols in an acidic or alkaline medium to form esters or polyesters. If they are reacted with bifunctional amines, polyamides result. The so obtained products may be utilized as raw materials for plastics and also, for example, as epoxide hardeners.

The invention is further illustrated by the following examples which are to be considered not limitative:

EXAMPLE 1:

1,8-diaza-9,10-dimethyl-Bicyclo-(4,4,0)-decane-(2,7)-dione 50 grams of 2,2-di (beta-cyanoethyl)-butanone-3, corresponding to about 0.28 mole, are heated at reflux for 24 hours with 138 grams of methanol and 25 ml of a 10 percent potassium hydroxide solution.

After cooling, 100 ml of water are added and the mixture is adjusted with diluted hydrochloric acid to a pH value of 5. The solution is then extracted several times with chloroform and the extraction mixture dried with sodium sulfate. The solvent is removed in a rotary evaporator. 47 grams of 1,8-diaza-9,10-dimethyl-bicyclo-(4,4,0)-decane-(2,7)-dione, a crystalline product recrystallized from ethanol and having a melting point of 237° C, are obtained. Yield of the pure product: approximately 80 percent of theory.

CHN analysis

|  | C | H | N | molar weight |
|---|---|---|---|---|
| Calculated | 61.2 | 8.22 | 14.28 | 196 |
| Found | 61.1 | 8.0 | 14.4 | 191 |

EXAMPLE 2:

1,8-diaza-9,10-dimethyl-bicyclo-(4,4,0)-decane-(2,7)-dione 100 grams of 2,2-di(beta-cyanoethyl)-butanone-3, corresponding to about 0.56 mole, are heated at reflux for 28 hours with 500 ml of tert.-butanol and 50 ml of a 10 percent potassium hydroxide solution. After cooling, 200 ml of water are added and the mixture is neutralized with diluted hydrochloric acid. The product is extracted several times with chloroform, the extract is dried with sodium sulfate and subsequently distilled in a rotary evaporator. The obtained raw product is recrystallized from ethanol. Yield: 90 grams, of 1,8-diaza-9,10-dimethyl-bicyclo-(4,4,0)-decane-(2,7)-dione corresponding to 82 percent of theoretical yield. Melting point: 237° to 238° C.

CHN ANALYSIS

The results of the elemental analysis corresponded to the results obtained in Example 1.

What is claimed is:

1. A process for the production of 1,8-diaza-9, 10-dialkyl-bicyclo-(4,4,0)-decane-(2,7)-diones of the formula:

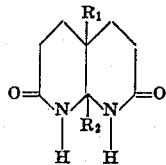

which comprises reacting a dicyanoethylated ketone of the formula:

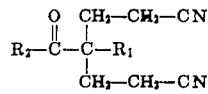

wherein $R_1$ and $R_2$ are independently selected alkyl groups having from 1 to 5 carbon atoms, in the presence of an inert solvent and a basic catalyst at a temperature of between about 20° and 200° C.

2. The process of claim 1 wherein the said basic catalyst is selected from the group consisting of alkali metal hydroxides, alkaline earth hydroxides, alkali metal alcoholates and alkaline earth alcoholates.

3. The process of claim 2 wherein from about 0.01 to about 0.5 mole of the said basic catalyst is employed per mole of dicyanoethylated ketone.

4. The process of claim 1 wherein the said dicyanoethylated ketone is reacted with about 200 to about 1000 grams of solvent per mole of dicyanoethylated ketone.

5. The process of claim 1 wherein the said solvent is selected from the group consisting of primary, secondary and tertiary alcohols.

6. The process according to claim 1 wherein the said solvent is selected from the group consisting of methanol, ethanol, isopropanol and tert.-butanol.

7. The process of claim 1 wherein the reaction is conducted at a temperature of between 60° and 120° C.

8. A compound of the formula:

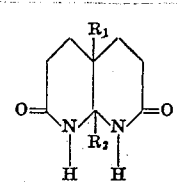

wherein $R_1$ and $R_2$ are independently selected alkyl groups having from 1 to 5 carbon atoms.

9. 1,8-diaza-9,10-dimethyl-bicyclo-(4,4,0)-decane-(2,7)-dione.

* * * * *